US005528217A

United States Patent [19]

Adams

[11] Patent Number: 5,528,217
[45] Date of Patent: Jun. 18, 1996

[54] COLLISION AVOIDANCE SYSTEM FOR VEHICLES USING DIGITAL LOGIC CIRCUITRY AND RETRO-FITTING TECHNIQUES

[76] Inventor: Christopher Adams, 4169 E. 187th St., Cleveland, Ohio 44122

[21] Appl. No.: 423,042

[22] Filed: Apr. 17, 1995

Related U.S. Application Data

[63] Continuation-in-part of Ser. No. 487, Jan. 5, 1993, abandoned.

[51] Int. Cl.[6] .............................. B60Q 1/00; G08G 1/16
[52] U.S. Cl. ..................... 340/435; 340/901; 340/903; 307/9.1; 180/169
[58] Field of Search ..................... 340/435, 436, 340/903, 904, 641, 642, 458, 901, 310.01, 310.08; 307/9.1, 10.1; 180/167, 169

[56] References Cited

U.S. PATENT DOCUMENTS

| | | | |
|---|---|---|---|
| 3,944,981 | 3/1976 | Akita et al. | 340/310 R |
| 3,975,708 | 8/1976 | Lusk et al. | 340/642 |
| 4,278,962 | 7/1981 | Lin | 340/436 |
| 4,714,912 | 12/1987 | Roberts et al. | 340/310 R |
| 4,801,938 | 1/1989 | Holmes | 340/904 |

*Primary Examiner*—Donnie L. Crosland
*Attorney, Agent, or Firm*—Clay Holland, Jr.

[57] ABSTRACT

A continuous exterior perimeter monitoring system for collision avoidance by vehicles with exterior objects is provided utilizing microelectronic digital logic circuits and techniques to produce a visual three-digit numerical display, a discrete multi-color display and a multi-level sound warning system, indicating precise and range of distances of exterior objects from vehicles which could collide therewith within pre-selected distances. The time-to-distance circuits of the system are an integral part of the digital logic circuits that are utilized to ascertain distances and such circuits are in a compact electronic package adapted to and is readily installed and integrated into existing vehicles utilizing the existing wiring electrical power systems primarily as a retro-fitting process for vehicles or as an original installation.

17 Claims, 5 Drawing Sheets

COLLISION AVOIDANCE SYSTEM FOR VEHICLES USING DIGITAL LOGIC CIRCUITRY AND RETRO-FITTING TECHNIQUES

This application is a continuation-in-part of application Ser. No. 08/000,487, filed Jan. 5, 1993, entitled "COLLISON AVOIDANCE SYSTEM FOR VEHICLES USING DIGITAL LOGIC CIRCUITRY AND TECHNIQUES", now abandoned.

FIELD OF THE INVENTION

The present invention relates to collision avoidance systems for vehicles and the retro-fitting of such vehicles utilizing the existing electrical wiring systems thereof. Such vehicles are usually pre-wired during manufacture with wiring harnesses that are used to operate and monitor such vehicle functions as, side and back marker lights, licence plate lamps, turn signal and hazard lamps, stop lamps, back-up lights and anti-lock brake devices and the like. Prior art electrical systems for vehicles such as tractor-trailers traditionally provide access to these electrical functions through what is commonly called an electrical "nose-box", which may be more specifically defined as a multicable or harness interconnection female-male plug device having female receptacles for receiving a multi-cable male interconnect adaptor device having prongs corresponding to the female receptacles. In general, the various wire conductors of such arrangements are used as the power and return lines for an electrical function of the vehicle. The present invention utilizes this wiring arrangement to advantage in gaining access to the power system and other wire conductors for communicating digital logic signals from place to place in a vehiclar arrangement of tractor-trailers and otherwise.

BACKGROUND OF THE INVENTION

In the prior art to which this invention relates, there have been provided ultrasonic devices attached to the rear of vehicles, such as trucks to measure the distance between the rear end, tail-gate or other portions of the vehicle and a loading platform as an example. Other vehicles have been provided with ultra-sonic listening devices for warning when the noise level of an exterior object reaches a level indicative of collision possibilities. Some of the prior art systems use a plurality of transducers located around the sides of the vehicle and are connected to transmitters for sending sonic or electromagnetic pulses to distant objects. Each transmitter is correlated with a receiver for detecting sonic or electromagnetic reflected echoes from objects close by. The output of each receiver may be connected to individual indicator lamps and/or a warning device such that if any of the lamps is energized, the driver is warned that one or the other side of the vehicle is in danger of a possible collision. Other prior art devices in this art utilize mechanical means for switching the transmitter and receiver on and off, during the transmit or receive cycles, while yet other devices utilize radar systems or use a signal beacon type system for detection of objects. However, none of the prior art systems known to applicant utilize microelectronic digital logic circuitry and techniques to transmit and acquire returned echo signals converted to voltage signals to effectuate the measurement of time-to-distances of objects at discrete distances or within discrete distance ranges for display by processing such voltage signals with digital logic circuits and techniques to provide three forms of warning aids simultanously from the same echoed signals with a high degree of accuracy.

Reference to the following prior art patents will indicate the general state of the art as they may relate to the present invention as examples:

U.S. Pat. No. 3,842,397, to Thomas Sindle, issued Oct. 15, 1974; U.S. Pat. No. 3,975,708, to Joe F. Lusk, issued Aug. 17, 1976; U.S. Pat. No. 3,944,981, to Shigeyuki Akita, issued Mar. 16, 1976; U.S. Pat. No. 4,015,232, to Thomas Sindle, issued Mar. 29, 1977; U.S. Pat. No. 4,278,962, to Pin-Houn Lin, issued Jul. 14, 1981; U.S. Pat. No. 4,349,823, to Katsutoshi Tagami, issued Sep. 14, 1982; and U.S. Pat. No. 4,626,849, to John C. Sims, issued Dec. 2, 1986.

SUMMARY OF THE INVENTION

With a view toward utilizing the electrical wiring and power systems of existing vehicles to advantage, the present invention may be characterized as a "retro-fit" to existing vehicles, particularly with respect to large truck tractor-trailer arrangements, including tanden arrangements, so as to provide access to the existing electrical wiring system, thereby avoiding the disruption thereof or the need to provide independent electrical wiring systems to effectuate a retro-fit and integration of the present invention with existing electrical wiring and power systems. This is especially desireable and economically advantageous when a new system in accordance with the present invention is to be integrated into a fleet of existing tractor-trailers by a retro-fit.

The present invention provides the unique advantage of an electrical wiring system that may be adapted to the traditional wiring system utilizing low power voltage to drive microelectronic digital logic circuitry powered by the vehicle's existing battery system. More specifically, microelectronic digital logic circuits of the present invention uses high frequency acoustical waves transmitted and received returned echo signals to develop time-to-distance ranging signals of remote exterior objects that are processed and converted into preselected incremental and exact distances from the vehicle's exterior perimeter to thereby provide continuous monitoring for collision avoidance. Such distances are presented as warnings as a three digit numerical display, multi-distance discrete color display and audio warnings so as to avoid collisions with exterior objects in close proximity thereto. The three digit numerical display is generated by use of digital logic circuitry having time-to-distance conversion circuits which in combination with digital binary counter circuits therein, generate the numerical display. While the multi-color display of distances to objects and the audio warning alarms are generated by means of digital logic circuitry having at least three voltage comparator circuits for generating the logic signals required to actuate the color display and audio warning alarms.

Therefore, it is an object of the present invention to provide a collision avoidance system that may be readily adapted to and interchangeable within existing electrical systems for large tractor-trailers by means of a retro-fit.

Another object of the invention is to provide a multi-color visual panel display indicating at least three discrete distance ranges and two or more levels of audio alarm devices both located in the compartment of a vehicle as a continuous warning aid to the vehicle operator.

Yet another object of the invention is the provision of a unique microelectronic digital logic circuit system for generating ongoing time-to-distance parameters from transmit and received echo signals from exterior bodies that may cause collision incidents which are converted into priority encoded signals representing at least three discrete distances within a preselected range of distances for continuous display thereof and at least two discrete distances within a range of distances for audio warnings and utilizing such signals to generate corresponding three digit numerical displays as an aid to verification of such distances.

While another object of the invention is the provision of microelectronic logic circuitry that is readily adaptable to and compatable with existing and/or future vehicles systems to accomplish the recited and other objects heretofore unrealized in the prior art systems.

BRIEF DESCRIPTION OF THE DRAWINGS

The novel features which are believed to be characteristic of the invention as to its organization, method of construction and operation, will be better understood from the following description considered in connection with the accompanying drawings, in which illustrative embodiments of the invention as disclosed by way of examples.

In the drawings:

FIG. 2 is a rear view of the trailer shown in FIG. 1, that illustrates the location of several acoustical transducer/receiver devices disposed at exterior surfaces thereof;

FIG. 3 is a front view of the tractor shown in FIG. 1, that also illustrates possible locations of acoustical transducer/receiver devices disposed thereon;

FIG. 4 depicts a block diagram of a microprocessing and warning system which utilizes the electrical wiring and battery system of the vehiclar arrangement and the several microelectronic digital logic circuit components and their interconnections to communicate digital logic signals from a trailer to an operator's compartment of a tractor;

FIG. 5 depicts an electrical nose-box wiring connection adaptor shown in FIG. 1 in the broken line circle, illustrating a receptacle with such multiple wiring connections as ground, signal and auxiliary components and the like;

It it is understood that the phrases transducer/receiver and transmitter/receiver are the same and may be used interchangeably in the case.

DETAILED DESCRIPTION OF THE INVENTION

Figure 1:
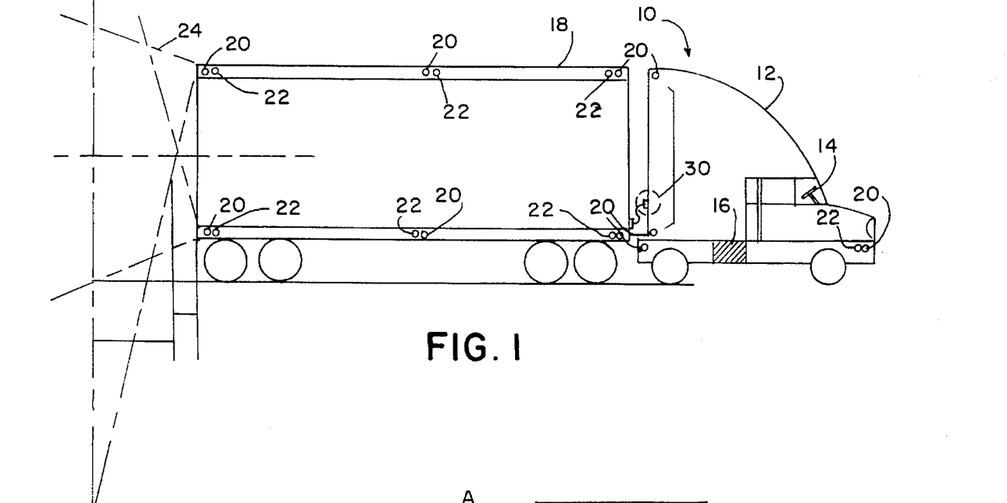
FIG. 1 is a plan view of a truck tractor-trailer vehicle arrangement depicting the type of vehicles that may utilize the present invention to advantage for collision avoidance.
Figures 2, 3, 4, 5:
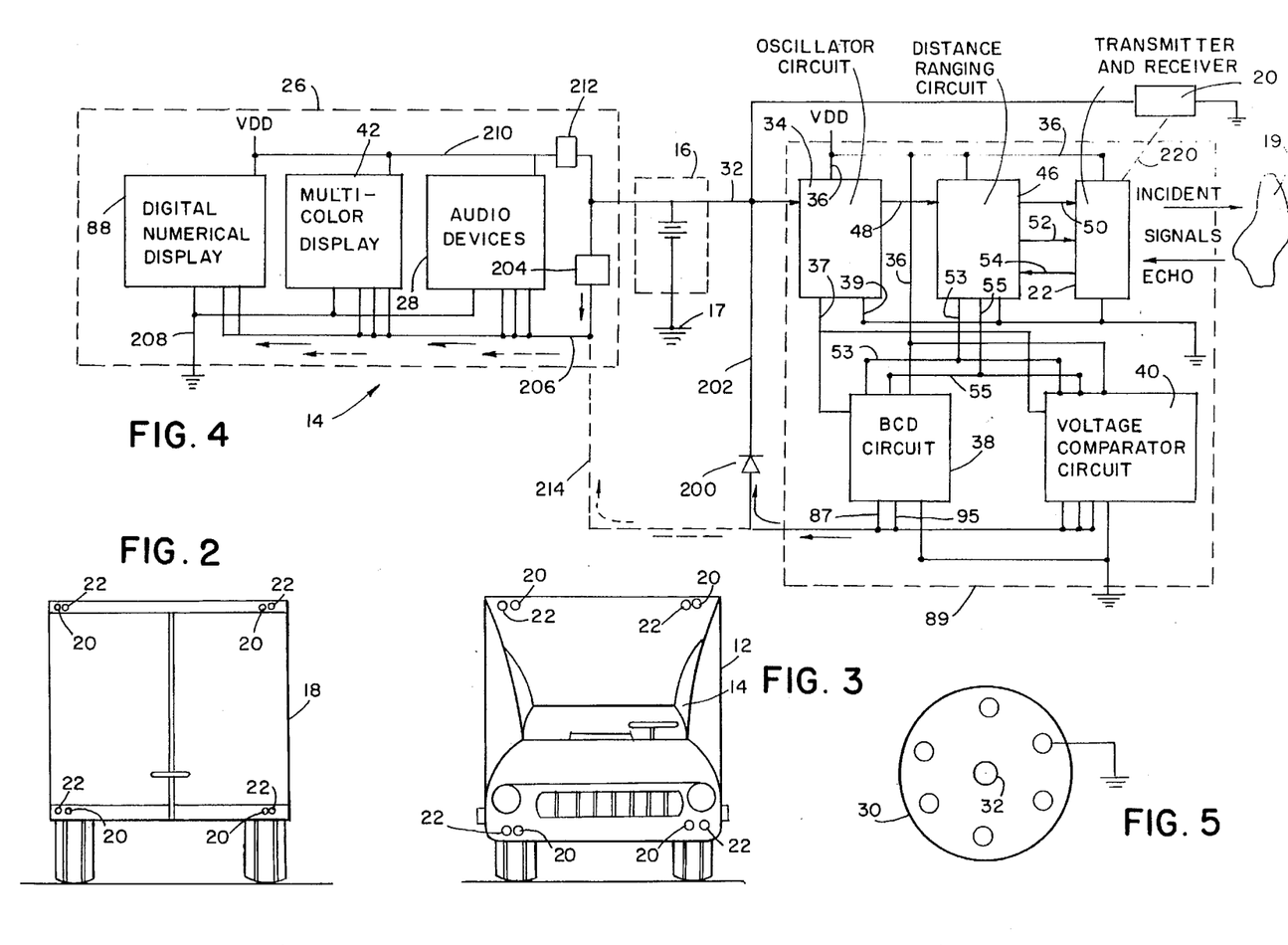

Referring now to the drawings FIGS. 1 through 12, the invention will be described with reference to the illustrative embodiments of the present invention. In FIG. 1, there is shown a motor vehicle 10 having a commerical truck tractor 12 with a driver/operator compartment 14 and a truck battery 16 to supply direct current voltage as part of the existing electrical power system. Connected to tractor 14 is a conventional cargo trailer 18 which may have a length in excess of 20 feet. As shown in FIG. 1, there is depicted the possible locations for a plurality of clearance/marker light devices 20, which is also the locations of a plurality ultrasonic acoustical transducer/receiver devices 22 in accordance with the teachings of the present invention. In some reto-fit applications the clearance/marker light devices may be adapted to be occupied by transducer/receiver 22 along with the marker light. A plurality of broken lines 24 at the rear of trailer 18 are shown to illustrate the propagation coverage from transducer/receivers. It should be noted that the wave sound coverage from transducer/receivers 22 may be rather complete with respect to areas of concern. FIGS. 2 and 3 depict the rear and front tract-or-trailer arrangement, respectively, illustrating the possible locations of transducer/receiver devices 22.

Referring now to FIG. 4, there is shown an illustrative block diagram depicting the various circuit components of the system of the invention. More specifically, vehicle compartment 14 is shown as containing a collision avoidance warning system 26, including visual displays of a numerical display 88 and a multi-color display 42; and an audio warning device 28 which may be one or more units that are capable of producing at least two levels of audio sound or audio messages. In FIG. 1, there is shown a nose-box adaptor 30 disposed at the rear of tractor 12, identified as (NB), in broken line circle. The details of the nose-box are shown in FIG. 5, illustrating the wiring conductors available from the various receptale connections of the vehicles such as a tractor trailer arrangement, including a ground connection and other conductors and an auxiliary or unused receptacle 32 that may be used for access to the electrical wiring system of the vehicles in accordance with the present invention.

Returning to FIG. 4, battery 16 is grounded by connection 17 to the chassis of the vehicle, and the battery is shown connected to an input an oscillator circuit 34. A positive voltage input line 32 is connected to circuit 34 which operates as the positive voltage source for the entire distance monitoring and measuring system. The system of this invention utilizes positive 5 volts throughouas the voltage reference level. The other circuit components include a distance ranging circuit 46, that is connected to circuit 34 by a first input line 48 for receiving a voltage oscillatory signal. Distance ranging circuit 46 is connected by a first output line 50 to a transducer/receiver 22 for inputting a low frequency high voltage clock signal thereto, and is connected by a second output line 52 to transducer/receiver device 22 for inputting a high frequency low voltage trigger and reference signal thereto. A second input of distance ranging circuit is connected to device 22 for receiving returned echo analog signals 54 therefrom.

Continuing with FIG. 4, oscillator circuit 34 is connected at second output terminal 36 for outputting system voltage power to distance ranging circuit 46, device 22, a digital logic processing circuit 38, and a voltage comparator processing circuit 40; a third output terminal 37 is connected for outputting anan oscillatory signal to digital logic circuit 38 and voltage comparator processing circuit 40. All of the foregoing circuits, namely oscillator 24, distance ranging circuit 46, device 22, digital logic processing 38 and voltage comparator processing 40 are grounded to the chassis of the vehicle. When distance ranging circuit 46 receives returned echo analog signals 54 from device 22, they are converted to digital logic signals that are outputted along with a high frequency low voltage signal, referred hereinafter as "two output signals" 53 and 55. It is noted that output signal 53 is the same signal inputted to device 22 along output line 52 as a trigger and reference signal. There is a time-to-distance relationship between signals 53 and 55, as they emerge from distance ranging circuit 46 in the form of digital logic signals which is a measure of the distance between a vehicle and an exterior object.

To continue it can be seen that the two output signals 53 and 55 are fed as inputs to digital logic processor 38 and voltage comparator processor 40. The output signals generated by processor 38 are voltage biasing signals 87 and binary-to-seven segment conversion signals 95 that are fed to a digital numerical display device 88 through a series connected diode 200 and a conductor 202 that is in turn connected to conductor 32. A conductor 206 is connected to conductor 32 through an interface circuit 204 which carries digital logic signals from circuit 38 an 40 to warning devices 88, 42 and 28 so as to produce the appropriate displays and audio warning sounds or messages of warning device 26.

As shown in FIG. 4, devices 88, 42 and 28 are all electrically grounded to the chassis of the vehicle through a conductor 208, and each receives electrical power through a conductor 210 to which they are connected and which in turn is connected to conductor 32 through a series connected voltage device 212. Also shown in FIG. 1, is a conductor 214, shown as a broken line, as an alternate conductor connection between a microprocessor 89 and warning system 26, including devices 88,42 and 28, that is connected directly to conductor 206. Conductor 214 may be characterized as an unused conductor contained in the pre-existing wiring arrangement of the vehicle arrangement, such as a tractor-trailer, illustrated and discussed with respect to FIGS. 1 and 5. It should be noted in FIG. 4, that a marker light 20 is shown as containing device 22 therein by the notation of a broken-line 220, while an exterior object 19 is shown receiving transmitted incident sound waves and also reflecting returned echo sound waves.

Figure 6:
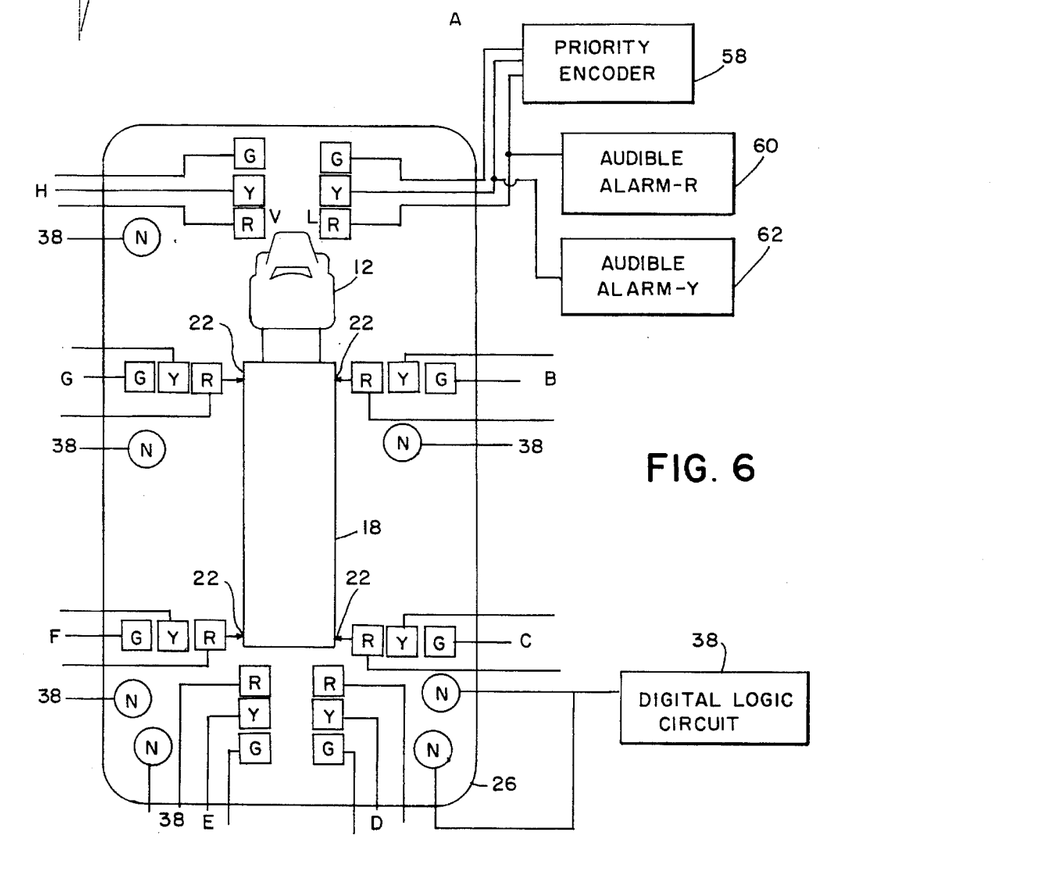
FIG. 6 depicts several block diagram circuits and a visual display panel of a warning system disposed in the operator tractor compartment, which illustrates a plurality of discrete color and numerical indicators in a group representing the possible locations of acoustical transducer/receiver devices shown in FIGS. 1, 2, and 3.

Referring now to FIG. 6, there is shown an illustrative warning display system 26 which has been depicted as being located in the driver/operator compartment 14 of truck-tractor 12. As shown each of the designated locations thereon is depicted by three squares having characters G for green, Y for yellow and R for red. Each of these squares represents an array of light-emitting-diodes(LED), that may become illuminated indicating distance ranges between the surfaces of the vehicles and a remote exterior object.

More specifically, when square G is illuminated it indicates that the object is between 10 to 15 feet from the surface of the vehicle in an area where an acoustical transducer/receiver 22 is disposed, square Y indicates a distance range of 5 to 10 feet and R is 0 to 5 feet. It should be noted that these distance ranges are related to the three digital logic voltage comparator circuits of a microprocessor 89, that may be preset to voltage levels which generate appropriate output signals corresponding to such distance ranges whenever proper AND signals are received by such preset voltage comparators. In FIG. 6 there is also shown a priority encoder circuit 58 depicting the circuit which interfaces with the array of LED that are the light sources for each green, yellow and red squares of the display panel 42 of warning system 26. A pair of audible alarm circuits and devices 60 and 62, are shown connected to outputs from priority encoder 58, so as to generate the multilevel warning signals associated with distances between 0 to ten feet as depicted. It should be noted that the distance ranges may be adjusted to be actuated in different distance ranges, if desired.

It is to be further noted that the circuit components connected and disposed at location A along with the numerical digital displays of display 88, denoted by an encircled N, are similarly connected to locations B through H and operate in the same manner as discussed with respect to location A. The appropriate circuits in each case B through H have been omitted in the interest of brevity in the discussion thereof.

Figure 7:
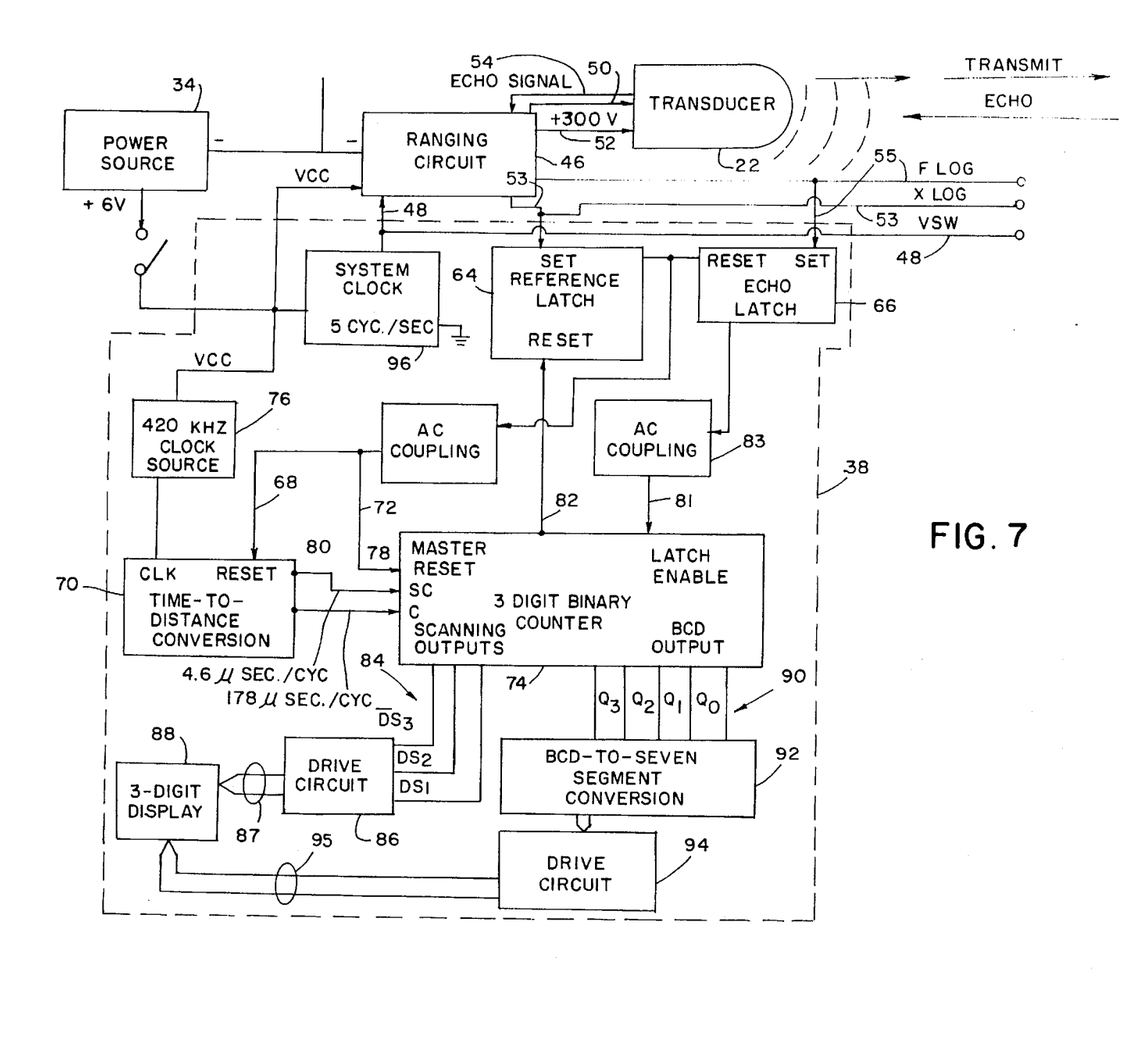
FIG. 7 is a block diagram of a numerical display and a processing circuit shown in FIG. 4, illustrating its interface with other circuits of the system.

Referring now to FIG. 7, there is shown a block diagram in more detail of the essential circuit components of the system wherein digital display circuit 38 is for receiving a plurality transmitter trigger and reference output signals 53, that are the same as signals fed to conductor 54, and a plurality of digital logic echo output signals 55 from distance ranging circuit 46 that are to be processed by digital logic circuit 38. Transducer trigger and reference output signal 53 are inputed to a logic reference latch circuit 64 so as to set the circuit in a state of readiness for the commencement of a cycle of time-to-distance determinations of detected remote objects and echo output signals 55 are inputed to a logic latch circuit 66 as a set signal which causes the time-to=distance process to begin. A reset signal from circuit 64 is inputed to circuit 66 to put it in a state of readiness for receiving echo set signals 55 once an echo activation pulse signal is acquired and transmitted to circuit 66; at the same instant a second reset signal 68 from circuit 64 is inputed to a time-to-distance conversion circuit 70, and a third reset signal 72 is inputed to a three-digit binary counter circuit 74, to put circuits 70 and 74 in a state of readiness. These reset signals are reoccurring during the start of each cycle of time-to-distance determination. As shown in FIG. 7, a system clock 96, is the oscillator circuit 34 depicted in FIG. 4.

Conversion circuit 70, receives clock pulses from a high frequency clock source 76 that is on the order of 420 kilohertz (kHz) and such high frequency is chosen to provide a high degree of accuracy required for the system. Circuit 70 processes the clock input from circuit 76 to produce two output signals, a clock reference pulse input signal 78 characterized as 178 micro-second pulses per cycle and a scanning clock pulse signal 80 characterized as 4.6 microsecond pulses per cycle, which are both inputed to the three digit binary counter circuit 74. Binary counter circuit 74 outputs a reset signal 82 to reference latch circuit 64 clearing the circuit at the end of each cycle so that the next cycle can commence. The time-to-distance process is commenced bu an latch enable signal 81 from echo latch 66 to binary counter circuit 74 through a coupling circuit 83.

The time-to-distance calculations for objects remote to the surface of the vehicle where the plurality of transducer/receiver devices 22 are disposed, is inversely proportional to the transmission frequency of devices 22 and may be better understood by reference to the following formula:

$$\lambda = c/f$$

where $\lambda$ is the wavelength measured in feet per cycle c—is a constant, the speed of sound at approximately 1,100 feet per second and f—is the frequency at which the transducers transmit in cycles per second.

Thus it can be seen that one foot of distance travelled in air is about 0.99 milliseconds and five feet is approximately 4.6 milliseconds. A 4.6 microsecond per cycle scanning clock selected for the illustrative embodiment in the disclosure relates to the distance range of 5, 10 and 15 feet, correspond to red, yellow and green color displays shown on the display panel of warning system 26, in that it is 1/1,000 of the time required to scan 5 feet of distance in air.

Continuing with the description of FIG. 7, the output signals of counter circuit 74 are from scanning clock input 80 in cooperation with clock reference input signals 78, are a plurality of diode biasing output voltages 84, generally designated $D_1$, $D_2$, and $\overline{D_3}$, that are inputed to a first drive circuit 86 which in turn are inputed as signals 87 to a set of three light emitting diodes as part of a 3-digit numerical display 88. These inputed bias voltages 87 are used for biasing and determining which and when each diode will be turned on during each cycle of a distance determining event. A second set of output voltage signals 90 from counter circuit 74, are characterized as binary-code-decimal voltages, generally designated as 90 and are inputed to a binary-to-seven segment conversion digital logic circuit 92. Conversion circuit 92 includes a digital logic matrix which utilizes the binarycoded decimal voltage signal to activate various combinations of light-emitting-diodes. The seven segments of each 3-digit display is activated by inputing a signal to the light-emitting-diodes which are biased for emission when a second signal 95 from a drive circuit 94 is applied. The output signals of circuit 92 inputed to drive circuit 94 so as to activate the applicable segments of each of the digital displays. Various segments of the seven segment display are excited when an output logical low signal is generated by circuit 92. When signals 90 are applied as discussed, the three digits display numerical characters corresponding to the distance of a detected object is produced with respect to the surface of a vehicle utilizing the system in accordance with the present invention. The resulting three digit numerical character display 88 is useful as a direct reading of distance and as a verification of red, yellow and green displays shown on the display panel of collision avoidance warning system 26, located in driver/operator compartment 14 of tractor 12, and as a precise measurement of distance.

Figure 8:
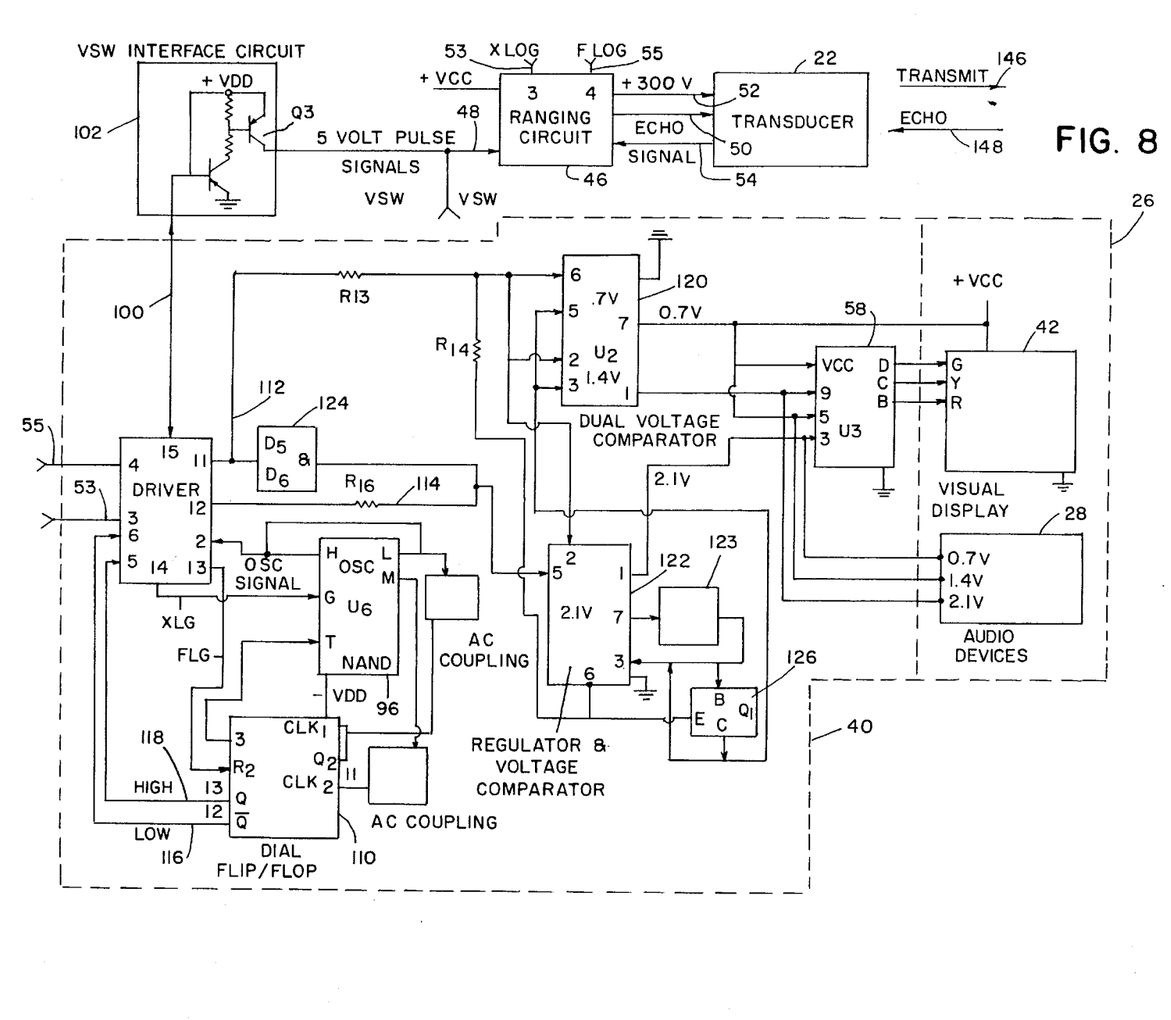
FIG. 8 is a block diagram of a voltage comparator processing circuit and warning system including a multi-color display and audio generating circuit shown in FIG. 4, illustrating their relative inter action and interface with other circuits of the system.

Referring now to FIG. 8, the description of the system is continued with a discussion of the voltage comparator processing circuit 40 for generating digital logic signals for multicolor display 42 and audio warning devices 28. As shown in FIG. 8, circuit 40 is essentially a block diagram for ease of description as to the organization and operation. An oscillation and a NAND digital logic circuit 96 is provided which commences its operation by the generation of an oscillation signal input to a drive and logic circuit 98. An oscillation signal 100 is inputed from circuit 98 to a voltage switching interface circuit 102, which has a transistor $Q_3$ that switches on and off, responsive to oscillation signal input 100, to generate voltage switching pulse signals generally designated VSW. Oscillation signal 100 is chosen at 5 cycles per second and causes VSW interface circuit 102 to generate an output signal to input line 48, which is connected to distance ranging circuit 46. The circuit 102 functions as circuit 34 shown in FIG. 4. The VSW signal is characterized as a 50 kilohertz signal having a cycle on the order of 20 microseconds wide with an amplitude of at least plus 5 volts, which corresponds to the clock reference voltage signal of the system fed to device 22 along output line 50 of circuit 46. The distance ranging circuit 46 generates a positive high voltage output signal fed along conductor 52 which is on the order of plus 300 volts as a trigger and reference signal causing a group of 56 pulses per cycle output signal from transducer/receiver 22 during a one millisecond on-time of a cycle. The interval between the group of 56 pulses is characterized as the off-time, during which time device 22 operates as a receiver of returned echo sound waves. During this off-time the receiver section operates so as to receive 5 echoed pulses prior to sending a true echo signal pulse 54 back to distance ranging circuit 46. The receipt of a series of 5 echoed pulses establishes a priority acquisition event of the system as to which echo pulses are used to determine the distance of a detected objected. Stated differently, objects nearest to the vehicle will produce a series of 5 pulses before a more remote object provides an appropriate set of 5 pulses. Thus, this feature of the invention uniquely operates to discern the closest objects from the more remote ones. This unique feature eliminates more complex systems which would be required to distinguish between multiple distance echoes. It can readily be understood that it is most desireable to identify close-in objects at the earliest opportunity, since the closer objects are those that which would cause a possible collision with the vehicle as compared with those objects that are not as close to the vehicle. The receipt of the 5 returned echoed pulses establishes a true pulse and has a relevant relationship to the the 178 microsecond per cycle clock signal in binary counter 74 of circuit 38. More specifically, by dividing 178 microseconds per cycle by 35.6 microseconds per pulse, 5 pulses per cycle is derived. Another aspect of the system is to note that the 4.6 microsecond per cycle scanning clock is small enough, on the order of 1,000 scans per 5 feet of distance travel of the transmitted signal to provide a high degree of accuracy desired in the detection of echoed pulses, that are used to produce the output signals from binary counter 74 which are utilized to generate the numerical characters for discussed hereinabove with respect to FIG. 7.

Returning now to FIG. 8, it can readily be see that reference triggering signal 53 and echo signals 55 are outputed from distance ranging circuit 46 and inputed to drive circuit 98 of circuit 40. These two received signals, 53 and 55, are processed and inpututed to oscillator/NAND circuit 96 and a dual flip-flop circuit 110, respectively. Processing of signals 53 and 55 between interacting digital logic circuits 98, 96 and 110 produces two output signals 112 and 114 from the drive circuit 98. When an output signal 116 is low and inputed to drive circuit 98, output signal 112 is generated and when an output signal 118 is high and inputed to drive circuit 98, output signal 114 is generated.

Output signal 112 is inputed to three voltage comparators a first voltage comparator 120, that operates as a dual voltage comparator circuit, and a second voltage comparator 122 that operates as a voltage comparator and a regulator. Output signal 114 passes through a resistor $R_{16}$ which is coupled with an output signal from two series connected diodes, designated 124, to input a non-inverted pulse voltage to combination comparator circuit 122. Another portion of output signal 112 passes through a resistor $R_{14}$ which is inputed to a collector of a transistor 126 and another signal is inputed to the base of transistor 126 from circuit 122. These circuit signals to transistor 126 causes an output signal from the collector of transistor 126 that is inputed to circuits 122, and both segments of voltage comparator 120.

Each of the three voltage comparators, i.e. dual comparators of circuit 120 and comparator 122 are set at three discrete low voltage levels of 0.7, 1.4 and 2.1 volts, respectively, wherein an output low signal is in the range of 0 to 2.5 volts, may be outputed representing a binary low output signal as a binary zero. When the comparators receive a high signal in the range of 2.6 to 5.0 volts, no output signal is created, resulting in a binary one. Stated differently, the comparators produce an AND output when the respective comparators receive input voltages that are equal to the preset voltage levels thereof and is a low signal when a zero occurs. When no voltage match occurs in a comparator the output is a high and a one occurs.

As shown in FIG. 8, a priority encoder 58, has two inputs from dual voltage comparator 120 and one from comparator circuit 122. These three incoming signals are processed by encoder 58 which in turn become inputs to a visual display 42, that includes an array of light-emitting diodes (LED). When these encoded signals are applied to the LEDs, they determine which of the LEDs will be energized to produce a display of red, yellow or green, designated R, Y and G, respectively, as appropriate which correspond to the distances of detected objects remote from a surface of the vehicle. It should be recalled that the colors, i.e. red, yellow and green represent a range of distances 0–5, 5–10 and 10–15 feet, respectively. The same signals inputed to encoder 58, are also utilized to activate an audio sound warning device 44, such as multiple sound buzzers or sound message devices included in device 44.

Figure 9:
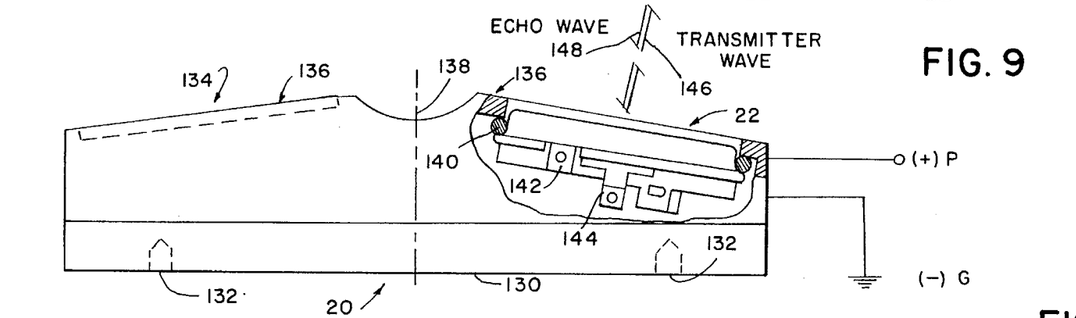
FIG. 9 depicts a view of a trailer marker light, partly in cross-section that is adapted to house a transducer/receiver device therein, that is disposed at various perimeter locations of the trailer or tractor shown in FIGS. 1,2 and 3.

Referring to FIG. 9, a marker light device 20 is depicted partly in cross-section. As shown marker light 20 has a mounting plate 130 that extends the length of the device and includes threaded mounting holes 132 for receiving screws or bolts for mounting the marker lights to the vehicle. Attached to mounting plate 130 is an enclosure 134 including a light transparent marker lens 136. On the right side of center line 138, is another marker lens 136 that has been adapted to receive and contain coustical device 22 along with an o-ring 140 for sealing device 22 from climatical conditions. Also shown is a negative electrical terminal 142 for electrical grounding thereof and a positive terminal 144 for receiving electrical input signals and for outputting signals. Terminal 144 is used for both incoming and outgoing signals. Outgoing acoustical waves a indicated by arrows 146 while returned echo waves are indicated by arrows 148.

Figure 10:
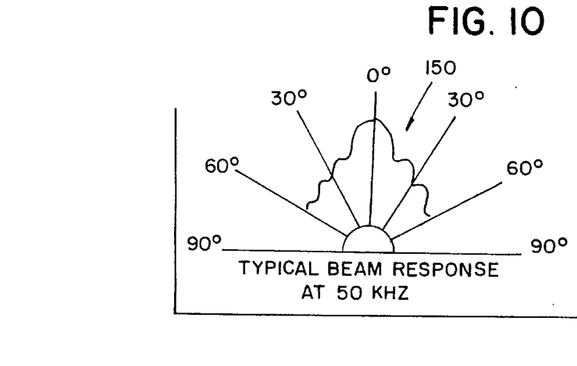
FIG. 10 depicts a plot of the acoustical wave beam pattern transmitted by the transmitter device shown in FIG. 9.
Figure 11:
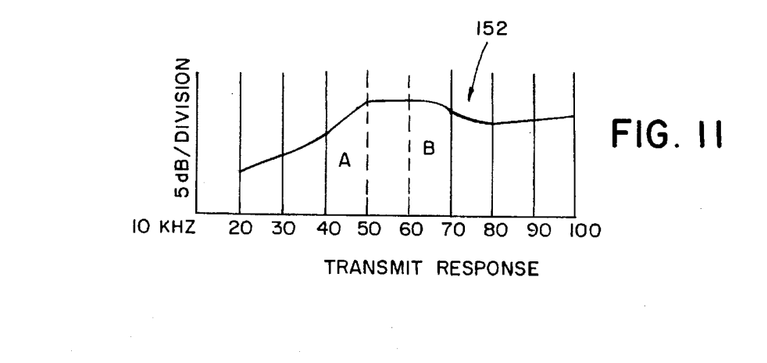
FIG. 11 depicts a plot of the transmitted response of transmitter/receiver device shown in FIG. 9, and denotes the frequency response band selected for use in accordance with the present invention.

Referring to FIG. 10, there is shown a typical beam or transmitted acoustical wave pattern 150 of device 22, when activated by a trigger signal at 50 kilohertz frequency. FIG. 11 shows a transmit frequency response curve 152, illustrating that the energy output response is relatively uniform in the frequency range of 50 to 60 kilohertz (kHz) as shown in the area of the curve between broken lines A-B of FIG. 11.

Figure 12:
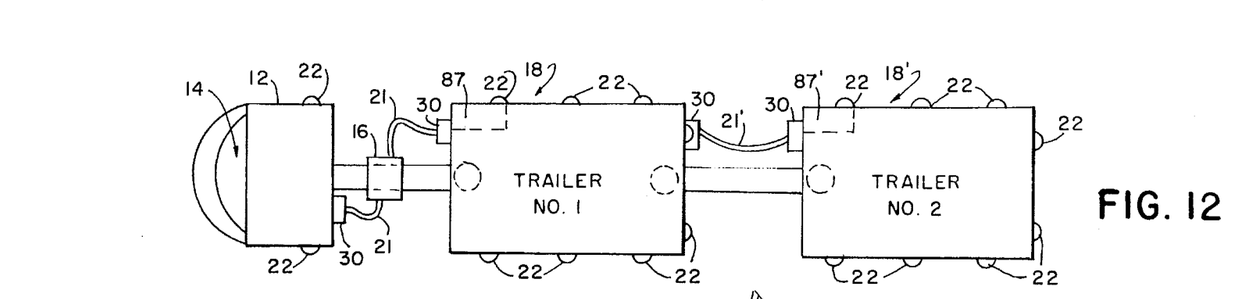
FIG. 12 depicts a plan view of a tractor-trailer, having a tandem trailer arrangement, illustrating the use thereof according to the present invention.

Continuing with reference to FIG. 12, there is depicted a tractor-trailer arrangement with two trailers 18 and 18', connected in tandum to tractor 12, similar to the single tractor-trailer arrangement of FIG. 1. As shown in FIG. 12, these vehicles are interconnected electrically by a traditional wiring harness 21 and 21' compatable with nose-box adaptors 30. The wires of harness 21 and 21' are compatable with the pre-wired systems of prior art trailers 18 and 18'.

It should be noted that devices 22 are disposed at each of eight locations A through H, corresponding to marker lights 20 locations, show in FIG. 6 and all units a energized from distance ranging circuit 46. In practice, a maximum of eight transducer/receiver devices should be activated by a single distance ranging circuit 46 for most efficient operation. If additional devices 22 are desired per vehicle, an additional distance ranging circuit 46 shoud be used. It should be understood that digital logic processing circuit 38 and voltage comparator processing circuit 40 are both capable of accommodating signal input from at least twenty-four devices 22 for efficient operation.

Another embodiment of the invention encompasses the use of suitable logic circuitry and techniques that enable a plurality of transducer/receiver devices 22 to used in asymmetrical or sequential mode of operation rather than having all of devices 22 activated at once. This embodiment recognizes that the order of priority in the acquisition of echo wave signals to establish or lock-in on a specific detected object is predicated on the nearness of the object in a rather limited area surraounding the surface of the vehicle and the need to receive five consecutive object echoed pulses. A clear understanding of the invention reveals that it is intended primarily for detecting stationary or slowly moving objects in near proximity to the space surrounding the vehiclar arrangement. For example, it may be desireable, when a tractor-trailer vehicle is backing into a loading dock, to have the rearward looking transducer/receiver devices 22 continuously activated while the side and front mounted devices 22 are activated in a preselected mode of operation, but not continuously. Various preselected modes of operation may be readily implemented by modifying distance ranging circuit 46 with a switching device located in the operator compartment 14 so that the operator can make the appropriate selection for the mode of operation desired. Such modifications of operation can readily be accomplished by modifications of the digital logic circuitry of distance ranging circuit 46 in conjunction with any switching arrangements provided in operator compartment 14.

At this juncture it may be note worthy to observe and emphasize certain unique features of the invention, namely:

a. the use of a traditional vehicle battery as the existing electrical power souce along with the vehicle's existing wiring system and nose-box adaptors for tractor-trailer arrangements providing a quick and easy means for retrofitting existing truck tractor-trailer fleets;

b. use of digital logic processing circuitry and accompanying low power consumption therefor for high efficiency and economical operation;

c. the use of multiple pulse wave acquisition of echoed signals from exterior objects closest to the vehicle or sections thereof of most concern and to increase the accuracy of acquisition of echoed signals by means of the five consecutive pulse technique in accordance with the disclosure of the present invention, to establish a true echo as the significant returned echo for processing;

d. use of the digital clock scanning technique in connection with the five pulse echo acquisition technique for accuracy of the time-to-distance determinations that is readily converted to numerical read-out from binary coded decimal data generated from such clock scanning process; and e. the ability of the system of the invention to provide warnings in three different modes of presentation.

The foregoing and other advances of the present invention are clearly apparent and recognizeable from the disclosure and offers advantages heretofore believed to be unavailable in the prior art.

The foregoing disclosure, drawings and teachings of the present invention readily and adequately demonstrate that identifying the specific distances and areas of locations of exterior objects remote from a vehicle or a vehiclar arrangement by means of received acoustical wave echo sinals from objects can be used to great advantage for converting such signals to digital logical signals for processing and interpretation by means of microelectronic digital circuitry. The use of these techniques provides aids to the driver/operator in the form of numerical, multicolor and audio warning presentations.

It is to be clearly understood that the above described embodiments are only illustrative of the principles applicable to the invention. Various other arrangements or modifications may be defined by those skilled in the art without departing from the spirit and scope of the invention. Consequently, it is understood that the present invention is intended to cover such modifications and the invention is limited only by the spirit and scope of the descriptive disclosure, content of the drawings and the appended claims.

What is claimed as new is:

1. A microelectronics collision avoidance detection and warning system having a plurality of detection devices remotely disposed about a perimeter of a vehicular arrangement for determining a distance between exterior objects and said vehicular arrangement by installing it as a retro-fit to the vehicular arrangement utilizing existing electrical wiring and power system thereof including its chassis, said installed retro-fit provides warnings to an operator compartment of the vehicular arrangement from said detection devices in the form of visual numerical and multicolor displays, and multiple audio sounds and messages, the combination comprising;

a. a digital microprocessor having an oscillator circuit with an input connected to said existing electrical wiring and power system of a vehicle for input of electrical power, and including a plurality of output terminals, said oscillator circuit generating oscillatory frequency output signals for said detection and warning system and electrically grounding through the chassis of said vehicle;

b. a distance ranging circuit connected at a first input terminal of an output of said oscillator circuit for receiving an oscillatory frequency signal and generating a low frequency high voltage clock output signal and a plurality of high frequency trigger and timing reference output signals; said distance ranging circuit having a second input terminal for receiving a plurality of analog echo return signals that are converted by said distance ranging circuit into a plurality of digital logic echo output signals; said plurality of high frequency trigger and timing reference output signals and digital logic echo signals being represented as two output signals having a time-to-distance relationship therebetween from which the distances between said vehicle and a plurality of exterior objects can be measured;

c. said plurality of detection devices include a dual-function acoustical detection device each operates first as a transmitter and subsequently as a receiver of ultrasonic acoustical sound waves and are disposed at selected perimeter locations of said vehicle; each of said acoustical detection devices has an input terminal connected to said distance ranging circuit for receiving said low frequency high voltage clock and said high frequency trigger and timing reference output signals therefrom to activate said acoustical detection devices as transmitters of a plurality of incident sound waves and subsequently as receivers of a plurality of returned echo sound waves; said plurality of returned echo sound waves being fed from said acoustical detection devices through said input terminal as analog echo return output signals to said second input terminal of said distance ranging circuit; a second terminal of said acoustical detection devices being connected to the vehicle chassis for electrical grounding;

d. a digital logical processing circuit having a first input terminal connected to said oscillator circuit for receiving an oscillatory frequency output signal; a second and third input terminal connected to said distance ranging circuit for receiving said two output signals having a time-to-distance relationship therebetween and converting said two output signals into a plurality of voltage biasing signals and binary coded decimal-to-seven segment digital logic signals that are fed to said existing electrical wiring and power system through a series connected diode device;

e. a voltage comparator processor circuit having a first input terminal connected to said oscillator circuit for receiving an oscillatory frequency output signal; a second and third input terminal connected to said distance ranging circuit for receiving said two output signals having a time-to-distance relationship therebetween and for converting said two output signals into a plurality of voltage signals that includes three ranges of voltages determined by preset voltage comparator circuits; each of said three ranges of voltages has a plurality voltage response levels which represent a time-to-distance measurement between said vehicle and an exterior object; said three ranges of voltage signals are fed to said existing wiring and power system through a series connected diode device;

f. an electronic digital logic signal warning apparatus remotely disposed from said detection devices, including a plurality of audio sound devices in combination having an output terminal and a plurality of input terminals; a first input terminal being connected to said existing electrical wiring and power system through a voltage divider circuit for input power and said output terminal being connected to said chassis for electrical grounding; and said other input terminals being connected to said existing electrical wiring and power system through a series connected interface circuit for receiving digital logic signals and activating said plurality of audio sound devices to generate multiple warning sounds and messages;

g. a numerical visual display system including a plurality of light emitting diodes in combination having an output and a plurality of input terminals; a first input terminal being connected to said existing electrical wiring and power system through said voltage divider circuit for electrical power and said output terminal being connected to said chassis for electrical grounding; said other input terminals being connected to said existing electrical wiring and power system through said series connected interface circuit for receiving digital logic signals for activating said plurality of light emitting diodes to produce a display of numerical characters of three digit-seven segment configuration; and h. a multicolor display including an array of light-emitting-diodes in combination having an output and a plurality of input terminals, a first input terminal being connected to said existing electrical wiring and power system through said voltage divider circuit for electrical power and said output terminal being connected to said chassis for electrical grounding; said other input terminals being connected to said existing electrical wiring and power system through said series connected interface circuit for receiving digital logic signals and for activating said array of light-emitting-diodes to produce a display of multiple colored square areas, wherein each said square areas represents a distinct range of distances measured between said vehicle and exterior objects as determined by said three ranges of voltage signals of said voltage comparator processor.

2. A microelectronics collision avoidance detection and warning system of claim 1, in which said digital microprocessor derives its electrical power from a positive current carrying wire of said existing electrical wiring and power system.

3. A microelectronics collision avoidance detection and warning system of claim 1, in which said output of said digital microprocessor and said inputs of said warning system receive digital logic signals directly from an auxiliary wire of said electrical wiring and power system without any connected interfacing devices.

4. A microelectronics collision avoidance detection and warning system of claim 1, in which said trigger and reference signals are further defined as a group of 56 pulses during an on-time cycle.

5. A microelectronics collision avoidance detection and warning system of claim 1, in which said digital microprocessor includes a plurality of said distance ranging circuits.

6. A microelectronics collision avoidance detection and warning system of claim 1, in which said voltage comparators are preset to respond to voltage ranges corresponding to measured distances of 0 to 5, 5 to 10 and 10 to 15 feet.

7. A microelectronics collision avoidance detection and warning system of claim 1, wherein said electronic microprocessor is connected directly to an auxiliary wire of said existing electrical wiring and power system without the benefit of an interfacing device.

8. A microelectronics collision avoidance detection and warning system of claim 1, wherein each of said acoustical transducer/receiver devices are disposed and contained within an individual marker light of said vehicular arrangement.

9. A microelectronics collision avoidance detection and warning system of claim 1, wherein said digital microprocessor and said collision avoidance and detection warning system derives electrical power from a positive current carrying wire of said existing electrical wiring and power system.

10. A method of retro-fitting multi-member vehicles with an electronic microprocessor digital logic detection and warning system for collision avoidance with exterior objects, utilizing an existing electrical wiring and power system common to the vehicles, comprising the following steps:

a. connecting a retro-fit circuit assembly including an electronic microprocessor, having circuit components consisting of a plurality of acoustical transducer/receiver devices, an oscillator, a distance ranging circuit, a voltage comparator and digital logic processing circuits, to the existing electrical wiring and power system of said vehicles for receiving electrical power therefrom; and connecting an output of said electronic microprocessor to a vehicle chassis for electrical grounding; said acoustical transducer/receiver devices being disposed at selected exterior perimeter locations of said vehicles;

b. connecting said electronic microprocessor to said existing system through a series connected diode to provide one-way digital logic signals flow from said electronic microprocessor to said existing electrical wiring and power system;

c. installing a warning system that includes a numerical display, a multicolor display and a plurality of audio sound devices in a driver compartment of said vehicles; connecting a warning system through a first input terminal and through a series connected voltage device to said existing electrical wiring and power system for receiving electrical power; said warning system being remotely disposed from said electronic microprocessor; and connecting an output of said warning system to the vehicle chassis for electrical grounding; and d. connecting a plurality of input terminals of said warning system to said existing electrical wiring and power system through a series connected interface circuit, for receiving digital logic signals from said existing electrical wiring and power system for activating a three-digit seven segment device to produce a numerical display; and for activating an array of light emitting diodes to produce multicolor display; and for activating said plurality of audio sound devices to generate multiple warning sounds and messages in said driver compartment of said vehicles.

11. A method of claim 10, wherein said electronic microprocessor components operate as digital logic circuits.

12. A method of claim 10, wherein a single returned echo signal is generated after receipt of each 5 echo sound-waves and is inputted to said distance ranging circuit.

13. A collision avoidance detection and warning system adaptable for retro-fit to vehicles having an existing electrical wiring and power system and utilizing the chassis of the vehicle as an electrical ground, comprising:

a. an oscillator circuit with an input terminal connected to a positive voltage carrying wire of said existing electrical wiring and power system, and a first output terminal connected to said chassis and three output terminals for generating oscillatory frequency signals;

b. a distance ranging circuit having two input terminals and five output terminals, a first input terminal being connected to an output terminal of said oscillator circuit to receive an oscillatory frequency signal and generating a high voltage low frequency clock and a plurality of high frequency trigger and reference output signals that are outputted from a first and second output terminal, respectively; a third output terminal is connected to said chassis for electrical grounding;

c. a plurality of multi-functional acoustical devices, having first and second input terminals each operates first as a transmitter of sound waves during an on-time and then as a receiver of echo signals during an off-time; said devices being connected to said distance ranging circuit at said first input terminal for receiving said clock output signals therefrom and at said devices second input terminal for receiving said trigger and reference output signals therefrom and activating said devices as acoustical sound wave transmitter during said on-time and as a receiver of returned echo signals during said off-time; said plurality of multi-functional acoustical devices being connected at a first output terminal of said acoustical devices to a second input terminal of said distance ranging circuit for inputting returned echo signals thereto, said distance ranging circuit converts said returned echo signals from said acoustical devices into digital logic echo signals that are one of two output signals from said distance ranging circuit having a time-to-distance relationship with said trigger and reference output signal which define a time interval that it takes for a transmitted acoustical sound wave pulse to produce a returned echo pulse from a remote exterior object;

d. a digital logic processing circuit having a first input terminal connected to an output terminal of said oscillator circuit for receiving an oscillatory frequency output signal, a second input terminal connected to a fifth output terminal of said distance ranging circuit for receiving a plurality of said digital logic trigger signals; a third input connected to a fourth output terminal of said distance ranging circuit for receiving a plurality of digital logic echo signals; said digital logic trigger and said digital logic echo signals are processed within said digital logic processing circuit to produce a plurality of output signals that equal a measure of the time-to-distance relationship between a transmitted sound wave and a received returned echo sound wave that are fed to a first drive circuit within said digital logic processing circuit to produce a plurality of binary coded digital output signals which also equal a measure of the time-to-distance relationship between a transmitted sound wave and a received returned echo sound wave, that are fed to a series connected coded decimal-to-seven segment conversion circuit and a second drive circuit within said digital logic processing circuit to produce a plurality of logic output signals; and e. a plurality of seven-segment light emitting diode devices of said detection and warning system connected to said first and second drive circuits of said digital logic processing circuit to receive output signals therefrom, for producing numerical displays of the distances of objects detected by each of said multi-functional acoustical devices.

14. A collision avoidance detection and warning system having an oscillator circuit, a distance ranging circuit and a plurality of multi-functional acoustical devices of claim 13, which further includes:

a. a voltage comparator processing circuit having a first input terminal connected to an output terminal of said oscillator circuit for receiving an oscillator frequency output signal; a second input terminal connected to said fifth output terminal of said distance ranging circuit for receiving a plurality of said digital logic trigger signals; a third input terminal connected to said fourth output terminal of said distance ranging circuit for receiving a plurality of digital logic echo signals; said digital logic trigger and echo signals are processed within said voltage comparator circuit to produce a plurality of voltage signals having levels which correspond to voltage ranges that equal a time-to-distance relationship between a transmitted sound wave and a received returned echo sound wave; said plurality of voltage signals are inputed to three internal voltage comparators circuits, each of said voltage comparator circuits are set to generate output signals in preset voltage ranges, respectively, when a voltage signal within said preset voltage ranges is inputed to a priority encoder circuit, for generating output signals which correspond to voltages within said preset ranges of said voltage comparators, that are utilized to activate an array of light emitting diodes used to illuminate a multicolor display and audio sound devices;

b. said multicolor display device having circuitry and an array of light emitting diodes in combination connected to said voltage comparator processing circuit for receiving encoded signals therefrom to produce an illuminated display in three distinct colors when said array is activated by said encoded signals;

c. said circuit and audio sound devices in combination connected to said voltage comparator processing circuit for receiving signals therefrom for producing multiple distinct warning sounds or messages corresponding to different ranges of distances of objects detected by said multi-functional acoustical devices.

15. A collision avoidance detection and warning system of claim 14, in which said multicolor device produces a display of green, yellow and red, each corresponding to three distinct ranges of distances of objects exterior to the perimeter of said vehicle detected by said multi-functional acoustical devices.

16. A collision avoidance detection and warning system of claim 13, in which said plurality of transmitted sound waves consist of a plurality of a group of pulses, each group of pulses being separated by a predetermined time interval, said grouped of pulses define an on-time for said transmitters and said time intervals between said grouped pulses defines an off-time for said transmitters.

17. A collision avoidance detection and warning system of claim 13, in which in said off-time, said acoustical devices receive a plurality of returned echo analog sound wave signals that are converted by said distance ranging circuit to a plurality of digital logic echo signals.

\* \* \* \* \*